United States Patent [19]

Nomura et al.

[11] 4,223,297

[45] Sep. 16, 1980

[54] SPEED ALARM SYSTEM FOR A MOTOR VEHICLE

[75] Inventors: Hiroyuki Nomura; Takaaki Mogi; Teruo Kawasaki, all of Yokohama; Masanori Mizote, Yokosuka; Kiyoshi Yamaki, Yokohama; Takashi Oka, Tokyo; Hideoki Matsuoka, Yokohama, all of Japan

[73] Assignee: Nissan Motor Company, Limited, Yokohama, Japan

[21] Appl. No.: 12,215

[22] Filed: Feb. 14, 1979

[30] Foreign Application Priority Data

Feb. 15, 1978 [JP] Japan .................. 53-16206

[51] Int. Cl.² .................. G08B 21/00; B60Q 1/54
[52] U.S. Cl. .................. 340/62; 324/166; 340/670
[58] Field of Search .................. 340/670, 62; 324/166

[56] References Cited

U.S. PATENT DOCUMENTS

| | | | |
|---|---|---|---|
| 1,010,412 | 12/1911 | Butler | 340/670 |
| 3,527,961 | 9/1970 | Palini | 324/166 |
| 3,704,445 | 11/1972 | Lanham | 340/62 |
| 3,754,121 | 8/1973 | Delay et al. | 324/166 |
| 3,968,434 | 7/1976 | Dixon et al. | 324/166 |
| 4,162,445 | 7/1979 | Campbell | 324/166 |

Primary Examiner—Glen R. Swann, III
Attorney, Agent, or Firm—Lowe, King, Price & Becker

[57] ABSTRACT

A speed alarm system for a motor vehicle comprises a speed sensor, a plurality of comparators responsive to the vehicle speed and respective preset reference speeds, and a plurality of lamps responsive to the output signals of the comparators. The threshold values which are defined by said reference speeds, are stepwisely arranged to change the number of the lamps energized. The number of energized lamps varies in accordance with the difference between the vehicle speed and a reference speed.

9 Claims, 2 Drawing Figures

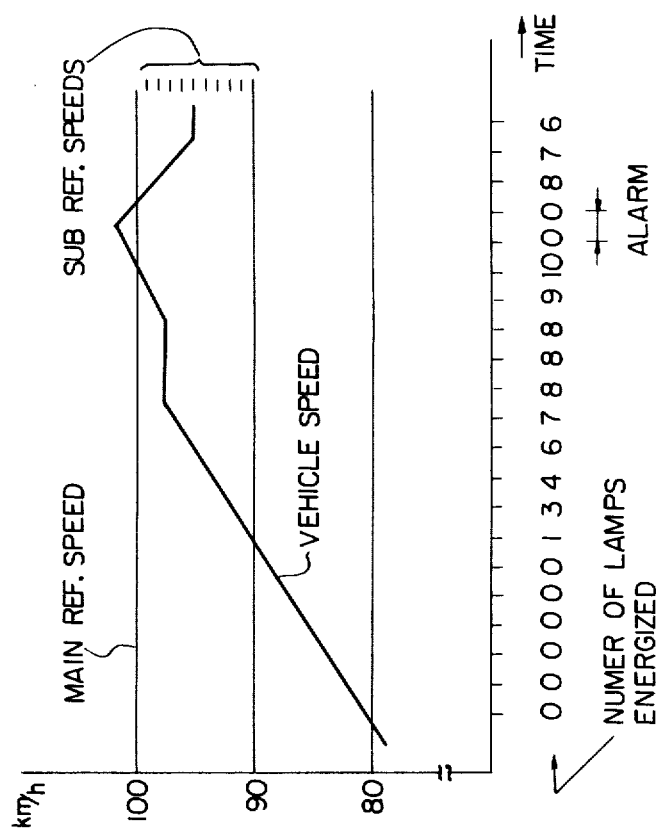

SPEED ALARM SYSTEM FOR A MOTOR VEHICLE

FIELD OF THE INVENTION

This invention generally relates to a speed alarm system for a motor vehicle. More particularly, the present invention relates to such a system for indicating the difference between the vehicle speed and a preset reference speed when the vehicle speed is within a predetermined range.

BACKGROUND OF THE INVENTION

Recently, motor vehicles are usually equipped with speed alarm systems. In one of these speed alarm systems, an alarm signal is issued when the vehicle speed exceeds a predetermined value which usually corresponds to the maximum speed specified in the traffic rules. In another speed alarm system, the reference speed at which an alarm is issued may be variable and is arranged to be set by the vehicle driver at will. However, in these conventional speed alarm systems, the alarm signal is issued only when the vehicle speed exceeds (or equals) a reference value, and therefore, the driver of the motor vehicle can not ascertain whether the vehicle speed is adjacent to the reference speed unless the driver watches the speedometer of the vehicle.

Further, when the reference speed of the speed alarm system is variable, the speed alarm system may be used as an indicator which supplies the vehicle driver with a guide speed at which the vehicle driver intends to drive the vehicle, wherein the reference speed may be changed in accordance with the conditions of the traffic and the road. In this case the vehicle driver has to pay attention to the difference between the vehicle speed and the reference speed. Since the speed alarm system does not indicate this difference, the vehicle driver has to see the speedometer to ascertain the same. To see the difference, the vehicle driver has to see both of the reference speed and the actual speed of the vehicle which is indicated by the pointer of the speedometer. However, it is quite dangerous to see the speedometer continuously while driving especially at high speed.

SUMMARY OF THE INVENTION

The present invention has been achieved in order to remove the above mentioned disadvantages of the conventional speed alarm system. In accordance with the present invention a series of lamps are provided to indicate the difference between the reference speed and the actual vehicle speed, while the reference speed is visually displayed in the form of numerals. The number of the lamps which emit light varies in accordance with the variation of the speed difference.

It is, therefore, an object of the present invention to provide a speed alarm system in which the difference between the reference speed and the actual vehicle speed is visually displayed.

Another object of the present invention is to provide such a system in which the vehicle driver can control the vehicle speed readily and safely.

BRIEF DESCRIPTION OF THE DRAWINGS

These and other objects and features of the present invention will become more readily apparent from the following detailed description of the preferred embodiment taken in conjunction with the accompanying drawings in which:

FIG. 2 shows in graphical representation the relationship between the vehicle speed and the number of energized lamps shown in FIG. 1.

DETAILED DESCRIPTION OF THE PREFERRED EMBODIMENT

Figure 1:
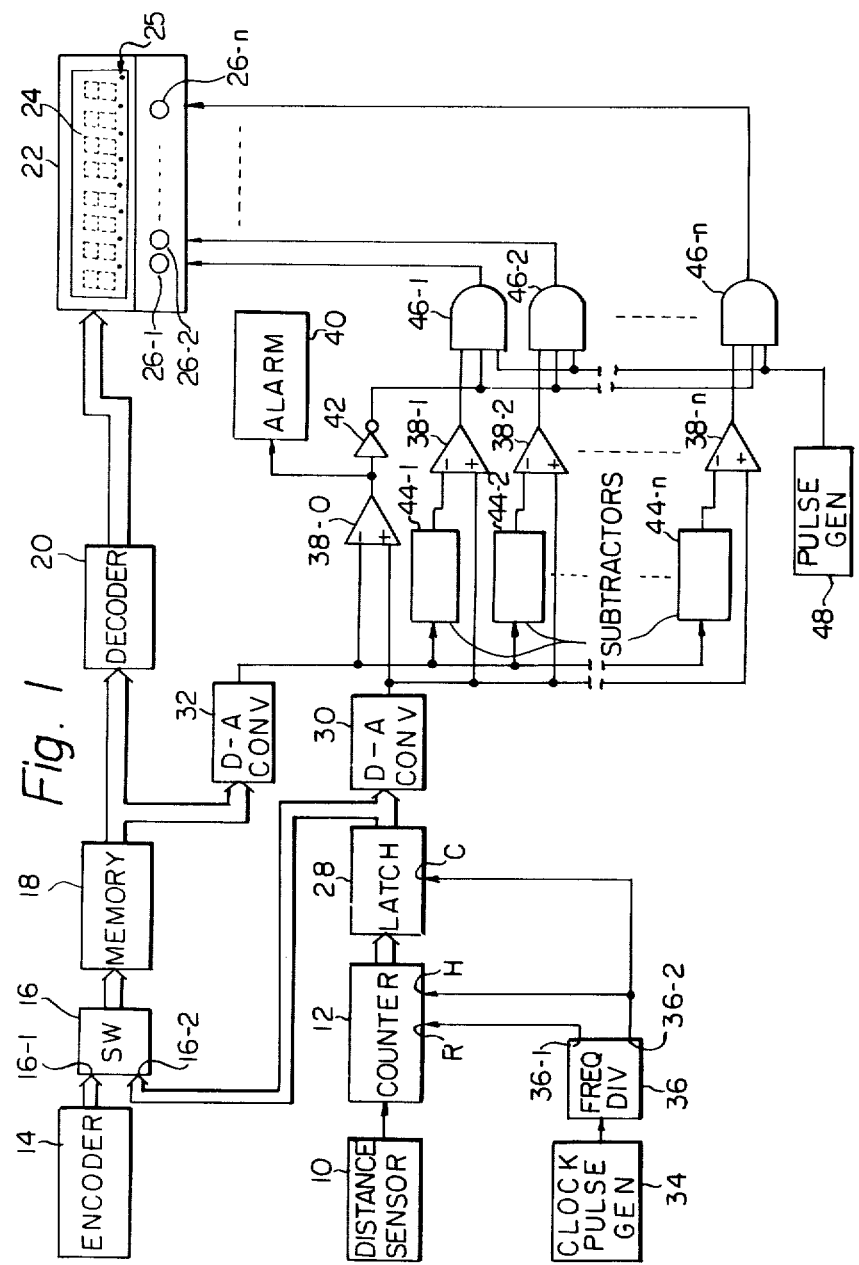
FIG. 1 shows in schematic block diagram form a preferred embodiment of the speed alarm system according to the present invention.

Reference is now made to FIG. 1, which shows the block diagram of the preferred embodiment of the speed alarm system according to the present invention. A distance sensor 10 comprises a pulse generator which generates a pulse each time the vehicle travels a predetermined unit distance. The distance sensor 10 is operatively connected to the transmission or other mechanism such as the odometer of the vehicle to sense the distance actually travelled by the vehicle. The output of the distance sensor 10 is connected to an input of a counter 12 which has reset and hold terminals R and H. The reset and hold terminals R and H are respectively connected to first and second outputs 36-1 and 36-2 of a frequency divider 36 the input of which is connected to an output of a clock pulse generator 34. The output of the counter 12 is connected to an input of a latch 28. The wide directed line between these circuits indicates that the connection between thereof is actually performed by a plurality of wires to transmit a binary coded signal. Other wide directed lines also indicate a plurality of wires in FIG. 1.

The latch 28 has a control terminal C connected to the second output 36-2 of the frequency divider 36. The output of the latch 28 is connected to a second input 16-2 of a switching circuit 16 and to an input of a digital to analog converter 30 the output of which is connected to noninverting inputs "+" of a plurality of comparators 38-0 to 38-n.

An encoder 14 includes a suitable keyboard (not shown) and is arranged to produce a binary coded signal indicative of a main reference speed which will be set manually by the keyboard. The output of the encoder 14 is connected to the first input 16-1 of the switching circuit 16. The output of the switching circuit 16 is connected to an input of a memory circuit 18 the output of which is connected to an input of a decoder 20 and to an input of a digital to analog converter 32. The output of the decoder 20 is connected to a display circuit 22 which includes a numeral display unit 24 and a plurality of lamps 26-1 to 26-n, such as light emitting diodes. The output of the digital to analog converter 32 is directly connected to the inverting input "−" of the comparator 38-0 and is connected via respective subtractors 44-1 to 44-n to the inverting inputs "−" of the remaining comparators 38-1 to 38-n.

The magnitude of the output signal of the digital to analog converter 32 corresponds to the main reference speed, while the magnitude of the output signals of the subtractors 44-1 to 44-n correspond to sub reference speeds the value of which are stepwisely arranged. The main reference speed will be used in the comparator 38-0 as a threshold voltage, while the sub reference speeds will be used as threshold voltages of the remaining comparators 38-1 to 38-n.

The output of the comparator 38-0 is connected to an input of an alarm device 40, such as a buzzer or a bell. The output of the comparator 38-0 is further connected via a NOT gate (inverter) 42 to second inputs of a plurality of AND gates 46-1 to 46-n. Each of the outputs of the remaining comparators 38-1 to 38-n is connected to the second input of each AND gate 46-1 to 46-n. Each of the AND gates 46-1 to 46-n has a third input connected to an output of a pulse generator 48. The outputs of the AND gates 46-1 to 46-n are connected to the display circuit 22, to cause respective lamps 26-1 to 26-n to emit light in accordance with the levels of the output signals of the AND gates 46-1 to 46-n. The number of the lamps 26-1 to 26-n is ten in this embodiment and may be changed if desired. It will be seen that only three lamps 26-1, 26-2 and 26-n are shown in FIG. 1 while other (seven) lamps are omitted for the simplicity. It will be further understood that seven subtractors, seven comparators and seven AND gates are not shown for the simplicity.

Although each of the subtractors 44-1 to 44-n is shown to have only one input terminal, each of the subtractors 44-1 to 44-n actually has another input terminal responsive to each reference signal. The reference signals may be produced by a suitable voltage divider (not shown) and are arranged to have different values from each other.

The speed alarm system shown in FIG. 1 operates as follows. The distance sensor 10 produces a pulse train signal as the vehicle is driven, in which the number of the pulses indicates the distance travelled by the vehicle. The number of the pulses per a predetermined period of time will be counted by the counter 12 since the counter 12 is controlled by reset and hold signals applied to the reset and hold terminals R and H respectively. The clock pulse generator produces a clock pulse train the frequency of which is predetermined. The clock pulses are applied to the frequency divider 36 which produces the above mentioned reset signal and the hold signal. The frequency divider 36 divides the frequency of the clock pulses by a predetermined number to produce two different output signals, i.e. the reset and hold signals, the interval between thereof corresponding to a predetermined period of time such as one second. The counter 12 is reset to zero each time the reset signal is applied thereto and counts the number of pulses until the hold signal is fed thereto. Therefore, the counter 12 produces an output signal, in the form of a binary coded signal, indicative of the number of pulses applied to the counter 12 for a predetermined period of time such as one second. This means that the output signal of the counter 12 indicates the vehicle speed and the value of the vehicle speed is refreshed at every predetermined period of time. The output signal of the counter 12 is supplied to the latch 28 to be stored therein. The storing function of the latch 28 is controlled by the hold signal from the frequency divider 36. It will be understood that the data stored in the latch 28 are refreshed at every predetermined period of time in the same manner. The datum each time stored in the latch 28, which datum is indicative of the instant vehicle speed, is applied to the digital to analog converter 30, in which the binary coded signal is converted into an analog signal. Consequently, the magnitude (voltage) of the output analog signal of the digital to analog converter 30 is an indication of the instant vehicle speed.

The switching circuit 16 which includes a manual switch (not shown) is provided to selectively supplying one of the output signals of the encoder 14 and the latch 28 to the memory circuit 18. When it is desired to manually set a main reference speed, the keyboard of the encoder 14 is operated to encode a decimal number corresponding to the main reference speed into a binary coded signal. The binary coded signal is applied via the switching circuit 16 to the memory circuit 18. On the other hand, when it is desired to set the main reference speed at the present vehicle speed, the output signal of the latch 28 is applied via the switching circuit 16 to the memory circuit 18. The datum stored in the memory circuit 18 is read out and is applied to the other digital to analog converter 32 in which the binary coded signal from the memory circuit 18 is converted into an analog signal the magnitude of which is an indication of a main reference speed which is preset. The output signal of the memory circuit 18 is further applied to the decoder 20 and is decoded so as to be able to energize the display unit 24 included in the display circuit 22. The display unit 24 includes eight seven-segment display devices. With this arrangement the main reference speed, such as 100 Km/h, which is preset in the memory circuit 18 is continuously displayed by the display unit 24.

The output signal of the digital to analog converter 32 is directly applied to the comparator 38 in which the main reference speed is compared with the actual vehicle speed applied from the other digital to analog converter 30. When the actual vehicle speeds equals the main reference speed, the comparator 38-0 produces a high level output signal which is applied to the alarm 40 to energize the same. The alarm device 40 issues an alarm signal for instance in the form of an audible sound, such as a tintinnabulation. The main reference speed signal from the digital to analog converter 32 is applied to all of the subtractors 44-1 to 44-n which produce output signals respectively indicative of the sub reference speeds. The first subtractor 44-1 is responsive to a reference signal the magnitude of which is arranged to correspond to a predetermined speed such as one kilometer per an hour. The second subtractor 44-2 is responsive to a second reference signal the magnitude of which corresponds to a second predetermined speed such as two kilometers per an hour. In the same manner remaining subtractors are respectively responsive to respective reference signals the magnitudes of which correspond to third, fourth . . . "n"th predetermined speeds. In the preferred embodiment the number of the subtractors is ten and therefore, the magnitude of the reference signal applied to the "n" subtractor 44-n corresponds to ten kilometers per an hour.

Assuming that the main reference speed preset in the memory circuit 18 is 100 kilometers per hour, the output signal of the first subtractor 44-1 indicates 99 kilometers per hour, while the output signal of the second subtractor 44-2 indicates 98 kilometers per hour. It will be understood that the third to "n"th, i.e. the tenth subtractors produce output signals the magnitude of which respectively indicate 97 Km/h, 96 Km/h, 95 Km/h, 94 Km/h, 93 Km/h, 92 Km/h, 91 Km/h and 90 Km/h. The respective output signals of the ten subtractors 44-1 to 44-n are fed to the inverting input "−" of the comparators 38-1 to 38-n so that each sub reference speed is compared with the actual vehicle speed from the digital to analog converter 30. This means that the subtractors 44-1 to 44-n provide the comparators 38-1 to 38-n with threshold voltages which are stepwisely arranged. It will be seen that the threshold voltages in this embodiment are arranged in an arithmetical series. When the vehicle speed is 90 kilometers per hour, only the tenth comparator 38-n produces a high level output signal, while other comparators 38-1 to 38-9 (not shown) produce low level signals. If the vehicle speed is below 90 kilometers per hour, none of the comparators 38-1 to 38-n produces a high level signal. It will be understood that the number of the comparators 38-1 to 38-n which produces high level output signals varies in accordance with the vehicle speed.

Each of the AND gates 46-1 to 46-n is supplied with a logic "0" (low level) signal from the NOT gate 42 when the output signal of the comparator 38-0 assumes a high level. Consequently, none of the AND gates 46-1 to 46-n is enabled. When the vehicle speed is below the preset main reference speed, the output signal of the comparator 38-0 assumes a low level and thus the NOT gate 42 produces a high level signal. The pulse generator 48 produces a pulse train signal the frequency of which is predetermined. All of the AND gates 46-1 to 46-n are enabled only when high level signals are fed from the NOT gate 42 and from the pulse generator 48. This means that each of the AND gates 46-1 to 46-n is enabled to transmit the output signal of the corresponding comparator 38-1 to 38-n periodically in accordance with high and low levels of the pulses applied from the pulse generator 48 when the vehicle speed is below the preset main reference speed.

The output signals of the AND gates 46-1 to 46-n are used to energize the lamps 26-1 to 26-n respectively. FIG. 2 illustrates the relationship between the variation in vehicle speed and the number of energized lamps. When the vehicle speed is 90 kilometers per hour, only one lamp 26-n emits light. If the vehicle speed is 98 kilometers, nine lamps 26-2 to 26-n emit light while one lamp 26-1 remains deenergized. When the vehicle speed exceeds 100 kilometers per hour, none of the lamps 26-1 to 26-n emits light but the alarm device 40 issues an alarm signal. It will be seen that the number of lamps 26-1 to 26-n which emit light corresponds to the difference between the main reference speed and the actual vehicle speed. In other words, the series of lamps 26-1 to 26-n functions as a speed difference indicator. Therefore, when the vehicle driver intends to drive the vehicle at a predetermined speed such as 95 kilometers per hour, the driver so controls the accelerator pedal of the vehicle that the number of the lamps 26-1 to 26-n becomes six to maintain the predetermined speed.

When the display circuit 22 is disposed on the instrument panel of the vehicle, the number of the energized lamps will be readily ascertained by the vehicle driver. The increase of the number of the energized lamps and the decrease of the same directly correspond to the increase and decrease in the vehicle speed respectively, and therefore it is much easier for the vehicle driver to maintain the vehicle speed at an intended speed than the case of using the speed indicated by the pointer of the speedometer.

In this preferred embodiment the number of the energized lamps increases as the vehicle speed increases approaching to the main reference speed, that is the difference between the actual speed and the preset main reference speed is decreasing until the vehicle speed exceeds the preset main reference speed. However, if desired, it is possible to arrange these lamps 26-1 to 26-n in the manner that the number of energized lamps decreases as the vehicle speed increases. The lamps 26-1 to 26-n, which may be light emitting diodes, are disposed adjacent to the display unit 24 which displays the preset main reference speed, as shown in FIG. 1. These lamps 26-1 to 26-n are of course, electrically independent from the display unit 24 as described hereinabove. However, it is possible to use the display unit 24 as the speed difference indicator as will be described hereinbelow. As well known, the display unit 24 has a plurality of dot display portions 25 adjacent to each seven-segment numeral display portion. Though these dot display portions 25 are usually used to indicate the decimal point of the displayed number, these dot display portions 25 may be used as a speed difference indicator. When the outputs of the AND gates 46-1 to 46-n are coupled to respective circuits which cause the dot display portions 25 to be displayed, the series of the dot display portions 25 functions as the speed difference indicator in place of the lamps 26-1 to 26-n.

As shown in FIG. 1, the numeral display unit 24 is arranged to display a number of as far as eight figures. When three figures are used to indicate the preset main reference, the dot display portions adjacent to remaining five figures may be used as the speed difference indicator.

As described hereinabove, the subtractors 44-1 to 44-n are employed to produce a plurality of signals indicative of sub reference speeds the value of which are arranged in an arithmetical series. The values of the plurality of sub reference speeds indicated by output signals of the subtractors 44-1 to 44-n may be arranged in other than the arithmetical series, such as in a geometrical series. Further, other operational circuits such as a series of dividers or multipliers may be used instead of the subtractors 44-1 to 44-n to provide the comparators 38-1 to 38-n with suitable threshold voltages which are stepwisely arranged.

Furthermore, it is possible to arrange each lamps 26-1 to 26-n or the dot display portions 25 in the manner that the brightness of the lamps stepwisely increase in a sequence from the last lamp 26-n toward the first lamp 26-1. It will be further understood that the speed alarm system which includes a plurality of discrete elements and circuits as shown in FIG. 1, may be substituted with a microcomputer.

What is claimed is:

1. A speed alarm system for a motor vehicle comprising:
    (a) means for producing a first signal indicative of the instantaneous vehicle speed;
    (b) means for producing a plurality of second signals indicative of reference speeds which are of different values from each other;
    (c) first display means for displaying one of said reference speeds;
    (d) a plurality of comparators each responsive to said first signal and to a corresponding one of said second signals, each of said comparators producing an output signal when the vehicle speed indicated by said first signal has a predetermined relationship with respect to the reference speeds indicated by the corresponding one of said second signals; and
    (e) a plurality of second display means each responsive to the output signal of a corresponding one of said comparators.

2. A speed alarm system as claimed in claim 1, wherein said means for producing said first signal comprises:
    (a) a distance sensor for producing a pulse each time said vehicle travels a predetermined unit distance;
    (b) a counter responsive to pulses from said distance sensor, said counter counting the number of pulses from zero when a reset signal is applied thereto until a hold signal is applied thereto;

(c) a clock pulse generator; and (d) a frequency divider responsive to the clock pulses from said clock pulse generator, said frequency divider producing said reset signal and said hold signal periodically, the interval between said reset and hold signals being predetermined.

3. A speed alarm system as claimed in claim 1, wherein said means for producing said second signals comprises:

(a) means for setting a main reference speed;

(b) a plurality of subtractors responsive to said main reference speed for producing signals indicative of sub reference speeds, said main and sub reference speeds being arranged in an arithmetical series.

4. A speed alarm system as claimed in claim 3, wherein said means for setting said main reference speed comprises:

(a) means for producing a third signal indicative of a speed;

(b) a switching circuit for transmitting one of said first signal and said third signal; and (c) a memory circuit responsive to the output signal of said switching circuit.

5. A speed alarm system as claimed in claim 3, wherein one of said comparators is responsive to said main reference speed, the remaining comparators each being responsive to a corresponding one of said sub reference speeds.

6. A speed alarm system as claimed in claim 5, further comprising a plurality of gate means each responsive to the output signal of said comparator which is responsive to said main reference speed and to the output signal of a corresponding one of said remaining comparators, each of said gate means being enabled to transmit the output signal of each of said remaining comparators when the vehicle speed indicated by said first signal has a predetermined relationship with respect to said main reference speed.

7. A speed alarm system as claimed in claim 6, further comprising a pulse generator the output of which is connected to one input of each of said gate means, each of said gate means being periodically enabled in accordance with the pulse signal from said pulse generator.

8. A speed alarm system as claimed in claim 1, wherein said second display means comprises a plurality of light emitting diodes.

9. A speed alarm system as claimed in claim 1, wherein said first display means comprises some of the digits of a multi-digit seven-segment display unit, each of said multi-digit seven-segment display units having a decimal-point display portion, some of said decimal-point display portions being used as said second display means.

* * * * *